United States Patent
Hu et al.

(10) Patent No.: US 11,034,028 B2
(45) Date of Patent: Jun. 15, 2021

(54) POSE DETERMINING METHOD FOR MOBILE ROBOT AND APPARATUS AND MOBILE ROBOT THEREOF

(71) Applicant: UBTECH ROBOTICS CORP LTD, Shenzhen (CN)

(72) Inventors: Xu Hu, Shenzhen (CN); Peng Nie, Shenzhen (CN); Wei Fang, Shenzhen (CN); Jiawen Hu, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 175 days.

(21) Appl. No.: 16/561,033

(22) Filed: Sep. 5, 2019

(65) Prior Publication Data

US 2021/0008730 A1 Jan. 14, 2021

(30) Foreign Application Priority Data

Jul. 9, 2019 (CN) .......................... 201910614300.1

(51) Int. Cl.
*B25J 13/08* (2006.01)
*G05D 1/02* (2020.01)
*G05B 19/18* (2006.01)

(52) U.S. Cl.
CPC ............ *B25J 13/089* (2013.01); *G05B 19/18* (2013.01); *G05D 1/0236* (2013.01); *G05D 1/0274* (2013.01); *G05B 2219/40423* (2013.01); *G05B 2219/40506* (2013.01)

(58) Field of Classification Search
CPC ................. B25J 13/089; G05B 19/18; G05B 2219/40423; G05B 2219/40506; G05D 1/0236; G05D 1/0274
See application file for complete search history.

(56) References Cited

U.S. PATENT DOCUMENTS

| | | | |
|---|---|---|---|
| 2007/0061043 A1* | 3/2007 | Ermakov | A47L 9/009 700/263 |
| 2012/0191287 A1* | 7/2012 | Shin | G05D 1/0274 701/28 |
| 2017/0212522 A1* | 7/2017 | Chung | G01C 21/00 |
| 2020/0050213 A1* | 2/2020 | Lim | G05D 1/0246 |
| 2020/0306983 A1* | 10/2020 | Noh | G06K 9/4604 |
| 2020/0356582 A1* | 11/2020 | Cui | G01C 21/20 |

* cited by examiner

Primary Examiner — Nicholas Kiswanto

(57) ABSTRACT

The present disclosure provides a pose determining method for a mobile robot as well as an apparatus and a mobile robot thereof. The method includes: obtaining a first position of a mobile robot in each local map after building an initial local map corresponding to a current environment and rotating; determining first environmental contour points of each of the local maps and corresponding first gradient directions, and obtaining a relative position of each of the first environmental contour points and the corresponding first position; building an angle histogram in each of the local maps; determining a second position of second environmental contour points of a global map and corresponding second gradient directions; and predicting a third position in the global map of the mobile robot, counting an appearance amount of the third positions, and determining a target pose of the mobile robot in the global map.

17 Claims, 6 Drawing Sheets

POSE DETERMINING METHOD FOR MOBILE ROBOT AND APPARATUS AND MOBILE ROBOT THEREOF

CROSS REFERENCE TO RELATED APPLICATIONS

This application claims priority to Chinese Patent Application No. 201910614300.1 filed Jul. 9, 2019, which is hereby incorporated by reference herein as if set forth in its entirety.

BACKGROUND

1. Technical Field

The present disclosure relates to mobile robot technology, and particularly to a pose determining method for a mobile robot as well as an apparatus and a mobile robot thereof.

2. Description of Related Art

In the case that a high-precision external localization system is not provided, a mobile robot usually does not know its current pose (i.e., position and posture) in a global map when it is started up, abducted, loses'its position, hence it needs to determine the current pose of the mobile robot its the global map in many scenarios.

In the prior art, a particle filter algorithm is generally used to determine the current pose of the mobile robot in the global map. However, the particle filter algorithm generates sample poses within the map through a random generator, and obtains the similarity through a similarity matching algorithm when generating the sample poses, so as to continuously aggregate particles to the region with high thereby obtaining the current pose of the mobile robot in the global map. That is, in the particle filter algorithm, the sampling pose is random, and it cannot guarantee that the true pose or similar pose of the mobile robot is included in all the sampled poses, which reduces the accuracy of the localization of the current pose of the mobile robot.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The embodiments of the present disclosure provide a pose determining method for a mobile robot as well as an apparatus and a mobile robot thereof, which are to solve the problem of the poor accuracy of the localization of the current pose of the existing mobile robot.

In order to make the object, the features and the advantages of the present disclosure more obvious and easy to understand, the technical solutions in the embodiments of the present disclosure will be clearly and completely described below in conjunction with the accompanying drawings in the embodiments of the present disclosure. It should be noted that, the described embodiments are only a part of the embodiments of the present disclosure, instead of all of the embodiments. All other embodiments obtained by those who skilled in the art based on the embodiments of the present disclosure without creative efforts are within the scope of the present disclosure.

Figure 1:
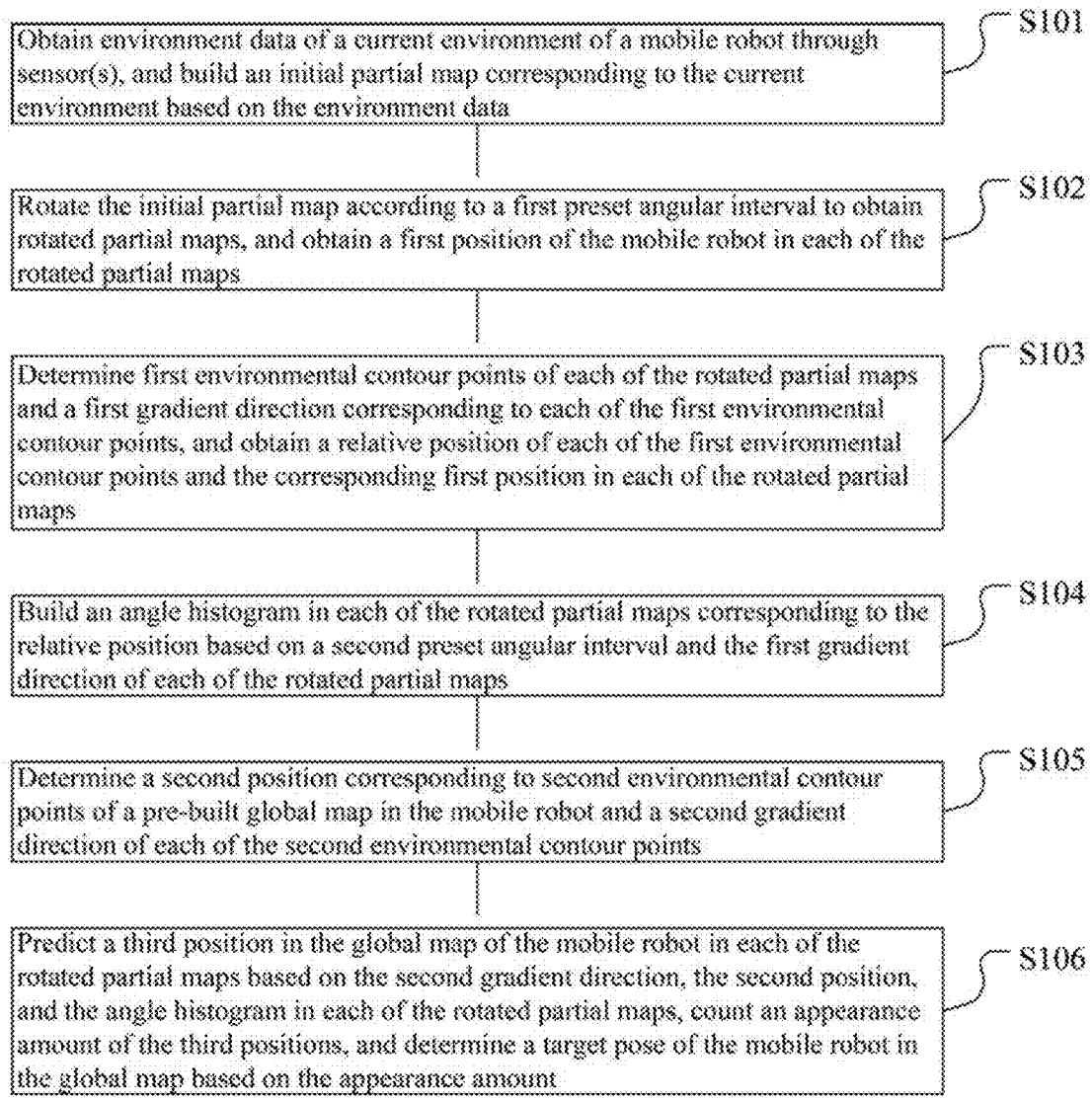
FIG. 1 is a flow chart of a pose determining, method for a mobile robot according to an embodiment of the present disclosure.

FIG. 1 is a flow chart of a pose determining method for a mobile robot according to an embodiment of the present disclosure. In this embodiment, a pose determining method for a mobile robot having sensor(s) is provided. The method is a computer-implemented method executable for a processor, w rich may be implemented through and applied to a pose determining apparatus shown in FIG. 5 or a mobile robot shown in FIG. 6, or implemented through a computer readable storage medium. As shown in FIG. 1, the method includes the following steps.

S101: obtaining environment data of a current environment of the mobile robot through the sensor(s), and building an initial local map corresponding to the current environment based on, the environment data.

Figure 2:
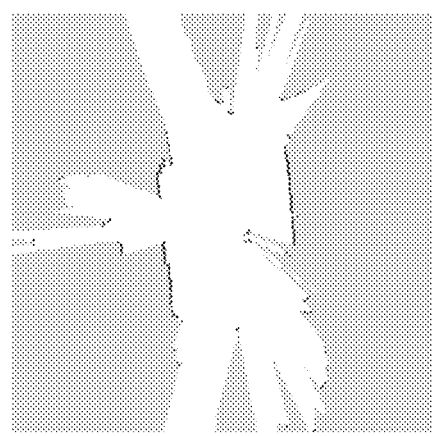
FIG. 2 is a schematic diagram of an example of a local map built by a mobile robot of the method of FIG. 1.

FIG. 2 is a schematic diagram of an example of a local map built by a mobile robot of the method of FIG. 1. As shown in FIG. 2, in this embodiment, if the mobile robot loses its pose (i.e., position and posture) in a global map, it can control the mobile robot to rotate one round at a current position, and can obtain environment data of the current environment in which the mobile robot is located through the sensor(s) of the mobile robot such as a laser scanner, so that the local maps corresponding to the current environment such as the local map shown in FIG. 2 can be built by the simultaneous localization and mapping (SLAM) technology (hereinafter referred to as the SLAM technology).

Figure 3:
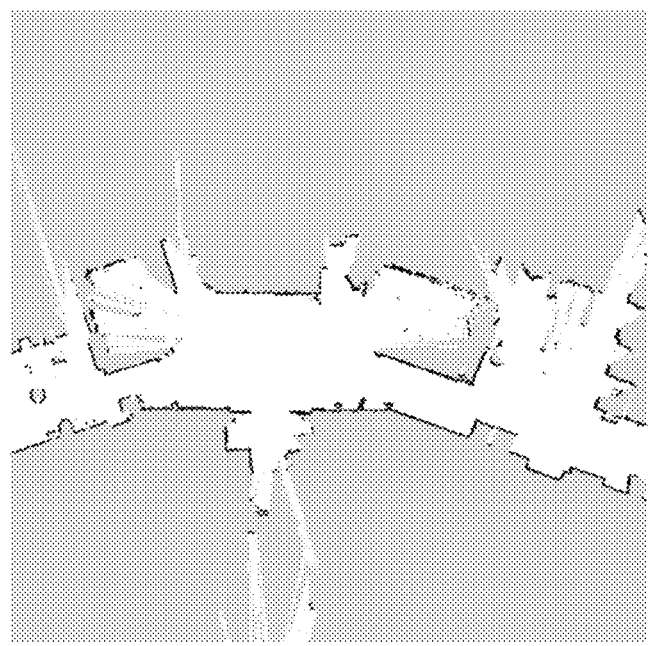
FIG. 3 is a schematic diagram of an example of a global map built by a mobile robot of the method of FIG. 1.

FIG. 3 is a schematic diagram of an example of a global map built by a mobile robot of the method of FIG. 1. As shown in FIG. 3, it should be noted that, the global map may also be built through the sensor(s) such as a laser scanner and using the SLAM technology, that is, it may control the mobile robot to move all over the environment in which it is to be navigated or operates, and obtains the environment data in real time through the laser scanner during moving, so as to build the global map of the environment in which the mobile robot is, to be navigated or operates such as the global map shown in FIG. 3 based on the obtained environment data by using the SLAM technology, and stores the built global map in a storage device of the mobile robot, so that the global map may be obtained from the storage device in the subsequent uses.

S102: rotating the initial local map according to a first preset angular interval to obtain rotated local maps, and obtaining a first position of the mobile robot in each of the rotated local maps.

S103: determining first environmental contour points of each of the rotated local maps and a first gradient direction corresponding to each of the first environmental contour points, and obtaining a relative position of each of the first environmental contour points and the corresponding first position in each of the rotated local maps.

For steps S102 and S103, if the initial local map corresponding to the current environment is built, a first pose of the mobile robot in, the local map can be determined, where the first pose includes a first position (x, y) and a first heading angle θ of the mobile robot in the local map. At the same time, an environment contour of the local map can be detected to obtain the first environmental contour points in the local map, for example, obtaining a position $(x_i', y_i')$ of each of the first environmental contour points in the local map and the first gradient corresponding to each of the first environmental contour points, and a relative position $(-x_i', y-y_i')$ between each of the first environmental contour points and the first position of the mobile robot can be calculated based on a position $(x_i', y_i')$ of each of the first environmental contour points and the first position (x, y) of the mobile robot in the local map, where each relative position in the local map is a position difference of' the first position of the mobile robot and the position of the corresponding first environmental contour point.

Specifically, in this embodiment, a Sobel operator may be used to detect the first environmental contour points, of each of the rotated local maps and the first gradient corresponding to each of the first environmental contour points, where the first gradient may include a first gradient dx of each of the first environmental contour points in a latitudinal direction (also referred to as an X direction) and a first gradient dy of each of the first environmental contour points in a longitudinal direction (also referral to as a Y direction). In the Sobelian operator, the convolution factor of the X direction can be $$G_X = \begin{bmatrix} -1 & 0 & +1 \\ -2 & 0 & +2 \\ -1 & 0 & +1 \end{bmatrix},$$

and the convolution factor of the Y direction can be $$G_Y = \begin{bmatrix} +1 & +2 & +1 \\ 0 & 0 & 0 \\ -1 & -2 & -1 \end{bmatrix}.$$

Furthermore, after the first environmental contour points of each rotated local map and the first gradient corresponding to each of the first environmental contour points are detected by using the Sobel operator, the first gradient direction corresponding to, each of the first environmental contour points in each rotated local map can be determined through the formula of $$Angle_{ij} = \arctan\left(\frac{G_{yij}}{G_{xij}}\right),$$

where $$Angle_{ij} = \arctan\left(\frac{G_{yij}}{G_{xij}}\right)$$

is the first gradient direction corresponding to the j-th first environmental contour point of the i-th rotated local map, and $G_{xij}$ is the first gradient of the j-th first environmental contour point of the i-th rotated local map in a first direction, and $G_{yij}$ is the first gradient of the j-th first environmental contour point of the i-th rotated local map in a second direction.

It should be noted that, the first direction described herein is the above-mentioned latitudinal direction or X direction, and the second direction described herein is the above-mentioned longitudinal direction or Y direction.

In this embodiment, information including the first environmental contour points and the corresponding first gradient directions in the built initial local map are obtained first, then the initial local map can be rotated according to the first preset angular interval, for example, the initial local map can be rotated at an angular interval of 2°, and then the first position and a first heading angle of the mobile robot in each of the rotated local maps can be determined. In which, the first heading angle of the mobile robot in each of the rotated local maps can be determined based on the formula (θ+2°*n), where θ is the first heading angle of the mobile robot in the initial local map, and n is the rotational amount corresponding to each rotated local map. At the same time, the Sobel operator can be used to detect the first environmental contour points of each rotated local map and the first gradient corresponding to each of the first environmental contour points, and the first gradient direction corresponding to each of the environmental contour points can be determined based on each first gradient, and the relative position between each of the first environmental contour points in each rotated local map and the first position of the mobile robot in the rotated local map can be obtained.

After obtaining the information including the first environmental contour points and the corresponding first gradient direction in the initial local map, the initial local map can be rotated by 2° to obtain the first rotated local map, and a first position (x1, y1) and a first heading angle θ1 of the mobile robot in the first rotated local map can be determined, where the first heading angle θ1 of the mobile robot in the first rotated local map is (θ+2°). After that, the Sobel operator can be used to detect the first environmental contour points of the first rotated local map and the first gradient corresponding to each of the first environmental contour points, the first gradient direction corresponding to each of the first environmental contour points in the first rotated local map can be determined based on each first gradient, and the relative position between each of the first environmental contour points in the first rotated local map and the first position (x1, y1) can be obtained. And then, the rotated local map can be rotated by 2° again to obtain the second rotated local map, and may determine a second position (x2, y2) and a first heading angle. θ2 of the mobile robot in the second rotated local map, where the first heading angle θ2 of the mobile robot in the second rotated local map is (θ+2°*2). After that, the Sobel operator can be used to detect the first environmental contour points of the second rotated local map and the first gradient corresponding to each of the first environmental contour points, the first gradient direction corresponding to each of the first environmental contour points in the second rotated local map can be determined based on each first gradient, and the relative position between each of the first environmental contour points in the second rotated local map and the second position (x2, y2) can be obtained, and so on until the local map is rotated 179 times to obtain 180 rotated local maps of different angles.

S104: building an angle histogram in, each of the rotated local maps corresponding to the relative position based on a second preset angular interval and the first gradient direction of each of the rotated local maps.

In this embodiment, after determining the first gradient direction corresponding to each of the first environmental contour points in each of the rotated local maps and the relative position of each of the first environmental contour points and the corresponding first position, for each rotated local map, a correspondence of each of the first, gradient directions and the corresponding relative position can be established. For example, in the first rotated local map, the first gradient direction of the first environmental contour point A ($x_A'$, $y_A'$) is determined as $\theta_A$, and in the first local map, the relative position a the first environmental contour point A and the first position of the mobile robot in the first local map is ($x_A-x_A'$, $y_A-y_A'$), then the correspondence between the first gradient direction $\theta_A$ and a point represented by the relative position ($x_A-x_A'$, $y_A-y_A'$) can be established.

Herein, after the correspondence between the first gradient direction and the relative position is built in each of the rotated local maps, the angle histogram corresponding to the relative position in each of, the rotated local maps can be built based on the second preset angular interval and the first gradient direction, that is, the first gradient direction can be divided first according to the second preset angular interval for each of the rotated local maps, for example, for each of the rotated local maps, the first gradient direction can be divided at an angular interval of 10° such as dividing [0°, 10°), [10°, 20°), and [20°, 30°) as an angular interval, respectively, so as to obtain 36 angular intervals, then the angular interval to which each of the first gradient directions belongs can be determined, and then the point represented by the relative positions can be divided into the angular interval to which the corresponding first gradient direction belongs based on the correspondence between the first gradient direction and the relative position, thereby realizing the division, of the relative position in each rotated local map to obtain the angle histogram corresponding to each of the rotated local maps.

Furthermore, step S104 may include:

step a: performing a pre-processing on each of the first gradient directions according to a preset processing manner to obtain a second angle corresponding to each of the first gradient directions; and step b: building the angle histogram in each of the rotated local maps corresponding to the relative position based on the second preset angular interval and the second angle.

For the above-mentioned steps a and b, it should be noted that the obtained first gradient direction is usually in a range of [−180°, 180°] while the angular interval in each angle histogram is usually in a range of [0°, 360°]. Therefore, when the angle histogram is built according to each first gradient direction, each first gradient direction can be first pre-processed, for example, a pre-processing of adding 180° may be performed on each first gradient direction, so that each first gradient direction is within the range of [0°, 360°], and then the angle histogram corresponding to the relative position in each rotated local map is built based on each first gradient direction and the second preset angular interval, thereby facilitating the correct construction of the angle histogram.

S105: determining a second position corresponding to second environmental contour points of a pre-built global map m the mobile robot and a second gradient direction of each of the second environmental contour points.

In this embodiment, the storage device of the mobile robot stores with the pre-built global map. As a result, the global map can be obtained from the storage device, and the Sobel operator can also be used to detect the second environmental contour points in the global map, so as to obtain the second position corresponding to each of the second environmental contour points and the second gradient corresponding to each of the second environmental contour points. After obtaining the second gradient corresponding to each of the second environmental contour points in the global map, the second gradient direction corresponding to each of the second environmental contour points in the global map can also be determined through the formula of $$Angle_j = \arctan\left(\frac{G_{yj}}{G_{xj}}\right),$$

where $Angle_j$ is the second gradient direction corresponding, to the j-th second environmental contour point of the global map, is the second gradient of the j-th second environmental contour point of the global map in the X direction, and $G_{yj}$ is the second gradient of the j-th second environmental contour point of the global map in the Y direction.

S105: predicting, a third position in the global map of the mobile robot in each of the rotated local maps based on the second gradient direction, the second position, and the angle histogram in each of the rotated local maps, counting an appearance amount of the third positions, and, determining a target pose, of the mobile robot in the global map based on the appearance amount.

Figure 4:
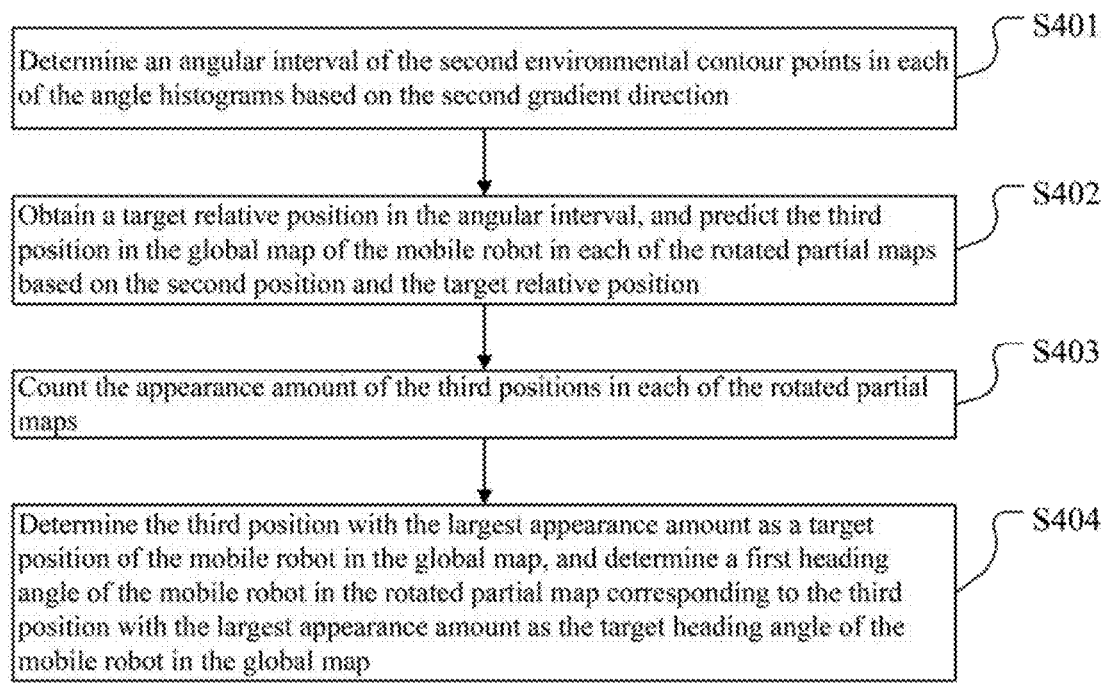
FIG. 4 is a flow chart of an example of step S106 of the pose determining method for a mobile robot of FIG. 1.

In this embodiment, after obtaining the second position and the second gradient direction corresponding to each second environmental contour point of the global map, the third position in the global map of the mobile robot in each of the rotated local maps can be predicted based on each of the second gradient directions, the second position, and the angle histogram, that is, predicting a possible position in the global map of the mobile robot in each of the rotated local maps. At the same time, the appearance amount of the third positions in the rotated local maps is counted, and the target pose of the mobile robot in the global map is determined based on the appearance amount in each or the rotated local maps, FIG. 4 is a flow chart of an example of step S106 of the pose determining method for a mobile robot of FIG. 1. As shown in FIG. 4, in this embodiment, step S106 may include:

S401: determining an angular interval of the second environmental contour points in each of the angle histograms based on the second gradient direction.

S402: obtaining a target relative position m the angular interval, and predicting the third position in the global map of the mobile robot in each of the rotated local maps based on the second position and the target relative position.

S403: counting the appearance amount of the third positions in each of the rotated local maps.

S404: determining the third position with the largest appearance amount as a target position of die mobile robot in the global map, and determining a first heading angle of the mobile robot m the rotated local map corresponding to the third position with the largest appearance amount as the target heading angle of the mobile robot in the global map.

For the above-mentioned steps S401-S404, in the angle histogram corresponding to each rotated local map, the angular interval to which the second gradient direction corresponding, to each second environmental contour point in the global map belongs in the angle histogram can be determined first. For example, if the angular histogram corresponding to the first rotated local map has angular intervals of [0°, 10°), [10°, 20°), [20°, 30°), and [350°, 360°), and the second gradient direction $\theta_B$ corresponding to the first second environmental contour point B ($x_B$, $y_B$) in the global map is 125°, it can determine that the angular interval in the first rotated local map to which the second environmental contour point B ($x_B$, $y_B$) belongs is [120°, 130°).

Herein, after determining that the angular interval of the second environmental contour point B ($x_B$, $y_B$) in the first rotated local map is [120°, 130°), all the relative positions in the angular interval [120°, 130°) are determined as the target relative positions, and the corresponding third position in the global map of the mobile robot in the first rotated local map is determined based on each target relative position and the second position ($x_B$, $y_B$) corresponding to the second environmental contour point B. For example, the third position in the global map corresponding to the mobile robot in the first rotated local map can be determined based on the relative position, that is, a position difference between the position of the mobile robot and the position of the environment contour point, where the third position is a possible position in the global map of the mobile robot the rotated local map. For example, if there are four relative positions of $O(x_o, y_O)$, $P(x_P, y_P)$, $Q(x_Q, y_Q)$, and $R(x_R, y_R)$ in the angular inter [120°, 130°), according to the second environmental contour point [B ($x_B$, $y_B$), it can determine that there are four possible positions in the global map of the mobile robot in the first rotated local map of ($x_o+x_B$, $y_O+y_B$), ($x_P+x_B$, $y_P+y_B$), ($x_B+x_B$, $y_Q+y_B$), and ($x_R+x_B$, $y_R+y_B$). After determining the possible positions in the global map of the mobile robot in the first rotated local map based on the second position ($x_B$, $y_B$) corresponding to the second environmental contour point B, the next second environmental contour point in the global map can be further obtained, and the possible positions in the global map of the mobile robot in the first rotated local map can be further determined based on the next second environmental contour point, and so on, until the possible position in the global map of the to robot in the first rotated local map is determined based on the last second environmental contour point in the global map.

It should be noted that, since the possible position in the global map of the mobile robots is the first rotated local map that are determined based on different second environmental contour points may the same, in this embodiment, it can count the appearance amount of each possible position corresponding to the first rotated local map, in such a manner, the appearance amount of each possible position corresponding to each local map can be obtained, thereby determining the target pose in the global map of the mobile robot based on the to appearance amount of each possible position in each rotated local map, for example, the possible position with the largest appearance amount can be determined as the target position of the mobile robot in the global map, and the first heading angle of the mobile robot in the rotated local map corresponding to the third position with the largest appearance amount can be determined as the target heading angle of the mobile robot in the global map.

It should be noted that, in this embodiment, the appearance amount of the possible positions in the global map of the mobile robots in each rotated local map is counted individually, that is, the appearance amounts between different rotated local maps will not be superimposed to each other, and the appearance amount needs to correspond to the rotated local map, for example, if the possible position D appears 4 times in the first resorted local map while appears 5 times in the second rotated local map, the appearance amount of the possible position D in the first rotated local map is 4 while the appearance amount of the possible position D in the second rotated local map is 5. If 5 is the maximum appearance amount, it can be determined that the target position of the mobile robot in the global map is D, and the target heading angle is the first heading angle of the mobile robot in the second rotated local map.

Furthermore, in this embodiment, before the step of determining the first heading angle of the mobile, robot in the rotated local map corresponding to the third position with the largest appearance amount as the target beading angle of the mobile robot in the global map, the method may include:

step c; obtaining an initial heading angle of the mobile robot in the initial local map before the initial local map is rotated; and step d: determining a rotational amount of each of the rotated local maps, and determining the first heading angle of the mobile robot in each of the rotated local maps based on the rotational amount, the first preset angular interval, and the initial heading angle.

For steps c and d, it should be noted that, the first heading angle of the mobile robot in, each rotated local map can be determined based on the heading angle corresponding to the mobile robot before the initial rotation, the rotational amount corresponding to the rotated local map, and the first preset angular interval, that is, determining according to the formula of $(\theta+\alpha°*n)$, where $\theta$ is the initial heading angle of the mobile robot in the initial local map, n is the rotational amount corresponding to each rotated local map, and $\alpha$ is the first preset angular interval that may be 2° or the like.

In this embodiment, the angle histogram is built by taking the first gradient direction corresponding to the first environmental contour points in each rotated local map as the identification feature, so that the target pose of the mobile robot in the global map can be accurately determined based on the second environmental contour points in the global map and each angle histogram, thereby improving the accuracy of the localization of the target pose.

It should be understood that, the sequence of the serial number of the steps in the above-mentioned embodiments does not mean the execution order while the execution order of each process should be determined by its function and internal logic, which should not be taken as any limitation to the implementation process of the embodiments.

The forgoing describes a pose determining method for a mobile robot. A pose determining apparatus for a mobile robot will be described in detail below.

Figure 5:
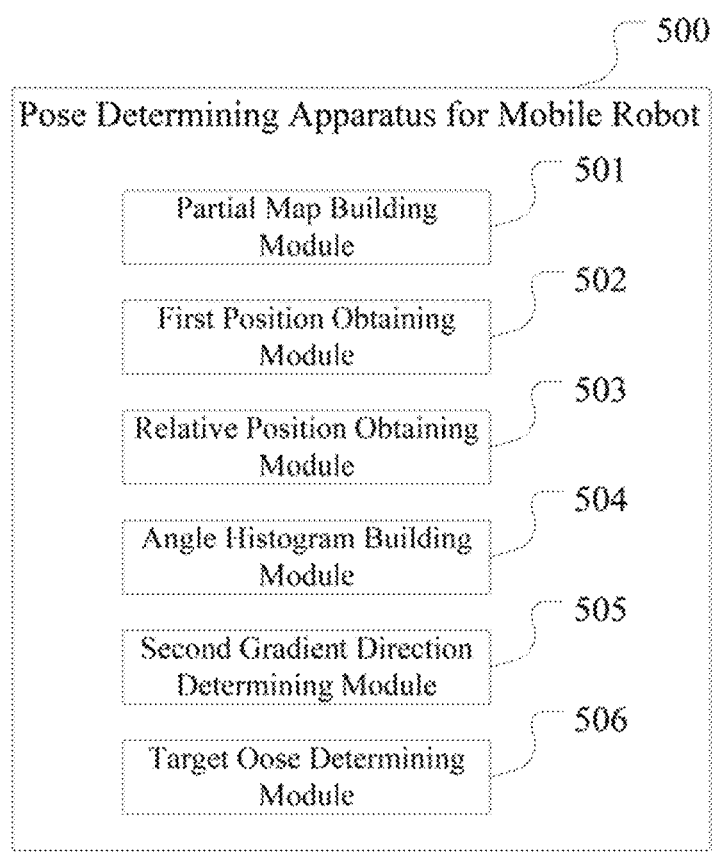
FIG. 5 is a schematic block diagram of a pose determining apparatus for a mobile robot according to an embodiment of the present disclosure.

FIG. 5 is a schematic block diagram of a pose determining apparatus for a mobile robot according to an embodiment of the present disclosure. In this embodiment, a pose determining apparatus 500 for a mobile robot having sensor(s) v provided. The pose determining apparatus 500 can be applied to a robot shown in FIG. 6, or be the robot itself. As shown in FIG. 5, the pose determining apparatus 500 includes:

a local map building module 501 configured to obtain environment data of a current environment of the mobile robot through the sensor(s), and build an initial local map corresponding to the current environment based on the environment data;

a first position obtaining module 502 configured to rotate the initial local map according to a first preset angular interval to obtain rotated local maps, and obtain a first position of the mobile robot in each of the rotated local maps;

a relative position obtaining module 503 configured to determine first environmental contour points of each of the rotated local maps, and a first gradient direction corresponding to each of the first environmental contour points, and obtain a relative position of each of the first environmental contour points and the corresponding first position in each of the rotated local maps;

an angle histogram building module 504 configured to build an angle histogram in each of the rotated local maps corresponding to the relative position based on a second preset angular interval and the first gradient direction of each of the rotated local maps;

a second gradient direction determining module 505 configured to determine a second position corresponding to second environmental contour points of a pre-built global map in the mobile robot and a second gradient direction of each of the second environmental contour points; and a target pose determining module 506 configured to predict a third position in the global map of the mobile robot in each of the rotated local maps based on the second gradient direction, the second position, and the angle histogram in each of the rotated local maps, count an appearance amount of the third positions, and determine a target pose of the mobile robot in the global map based on the appearance amount.

Furthermore, the target pose determining module 506 includes:

an angular interval determining unit configured to determine an angular interval of the second environmental contour points in each of the angle histograms based on the second gradient direction;

a second pose determining unit configured to obtain a target relative position in the angular interval and predicting the third position in the global map of the mobile robot in each of the rotated local maps based on the second position and the target relative position;

an appearance mourn counting unit configured to count the appearance amount of the third positions in each of the rotated local maps; and a target pose determining unit configured to determine the third position with the largest appearance amount a a target position of the mobile robot in the global map and determining a first heading angle of the mobile robot in the rotated local map corresponding to the third position with the largest appearance amount as the target beading angle of the mobile robot in the global map.

In one embodiment, the pose determining apparatus 500 may further include:

an initial heading angle obtaining module configured to obtain an initial, heading angle of the mobile robot in the initial local map before the initial local map is rotated; and a first heading angle determining module configured to determine a rotational amount of each of the rotated local maps, and determine the first heading angle of the mobile robot in each of the rotated local maps based on the rotational amount, the first preset angular interval, and the initial heading angle.

In one embodiment, the angle histogram building module 504 may include:

a second angle obtaining unit configured to perform a pre-processing on each of the first gradient directions according to a preset processing manner to obtain a second angle corresponding to each of the first gradient directions; and an angle histogram building unit configured to build the angle histogram in each of the rotated local maps corresponding to the relative position based on the second preset angular interval and the second angle.

Furthermore, the relative position obtaining module 503 may include:

a first gradient direction determining unit configured to detect the first environmental contour points of each of the rotated local maps through a Sobel operator, and calculate the first gradient direction corresponding to each of the first environmental contour points.

In one embodiment, the first gradient direction determining unit is configured to calculate the first gradient direction based on the following formula:

$$Angle_{ij} = \arctan\left(\frac{G_{yij}}{G_{xij}}\right);$$

where, $Angle_{ij}$ is the first gradient direction corresponding to the j-th first environmental contour point of the i-th rotated local map, and $G_{xij}$ is a first gradient of the j-th first environmental contour point of the i-th rotated local map in the first gradient direction, $G_{yij}$ is a first gradient of the j-th first environmental contour point of the i-th rotated local map in the second gradient direction.

In this embodiment, each of the above-mentioned modules/units is implemented in the form of software, which can be computer program(s) stored in a memory of the pose determining apparatus 500 and executable on a processor of the pose determining apparatus 500. In other embodiments, each of the above-mentioned modules/units may be implemented in the form of hardware (e.g., a circuit of the pose determining apparatus 500 which is coupled to the processor of the pose determining apparatus 500) or a combination of hardware and software (e.g., a circuit with a single chip microcomputer).

Figure 6:
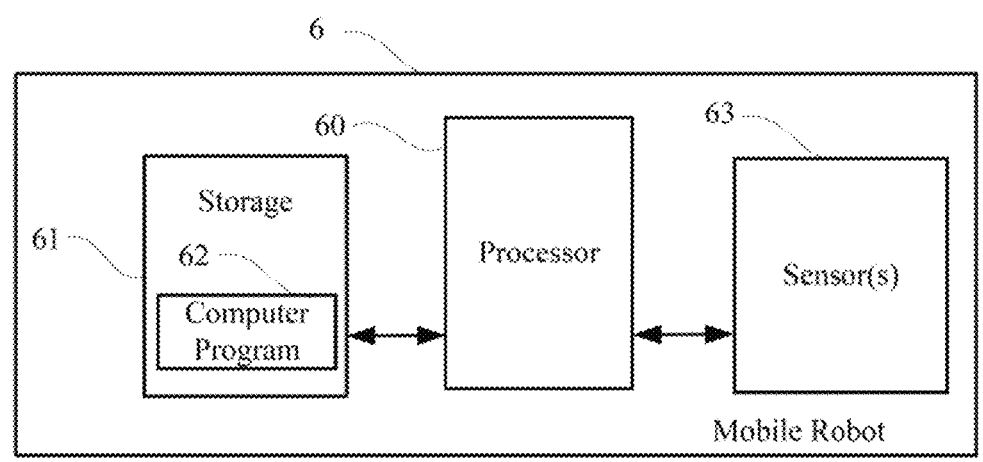
FIG. 6 is a schematic block diagram of a mobile robot according to an embodiment of the present disclosure.

FIG. 6 is a schematic block diagram of a mobile robot according to an embodiment of the present disclosure. In this embodiment, a mobile robot 6 is provided. As shown in FIG. 6, in this embodiment, the mobile robot 6 includes a processor 60, a storage 61, a computer program 62 stored in the storage 61 and executable on the processor 60, for example, a pose determining program for a mobile robot, and sensor(s) 63 such as a laser scanner. When executing (instructions in) the computer program 62, the processor 60 implements the steps in the above-mentioned embodiments of the pose determining method for a mobile robot, for example, steps S101-S106 shown in FIG. 1. Alternatively, when the processor 60 executes the (instructions in) computer program 62, the functions of each module/unit in the above-mentioned device embodiments, for example, the functions of the modules 501-506 shown in FIG. 5 are implemented.

Exemplarily, the computer program 62 may be divided into one or more modules units, and the one or more modules/units are stored in the storage 61 and executed by the processor 60 to realize the present disclosure. The one or more modules/units may be a series of computer program instruction sections capable of performing a specific function, and the instruction sections are for describing the execution process of the computer program 62 in the mobile robot 6. For example, the computer program 62 can be divided into a local map building module, a first position obtaining module, a relative position obtaining module, an angle histogram building module, a second gradient direction determining module, and a target pose determining module. The function of each module is as follows:

the local map building module is configured to obtain environment data of a current environment of the mobile robot through the sensor(s), and build an initial local map corresponding to the current environment based on the environment data;

the first position obtaining module is configured to rotate the initial local map according to a first preset angular interval to obtain rotated local maps, and obtain a first position of the mobile robot in each of the rotated, local maps;

the relative position obtaining module is configured to determine first environmental contour points of each of the rotated local maps and a first gradient direction corresponding to each of the first environmental contour points, and obtain a relative position of each of the first environmental contour points and the corresponding first position in each of the rotated local maps;

the angle histogram building module is configured to build an angle histogram in each of the rotated local maps corresponding to the relative position based on a second preset angular interval and the first gradient direction of each of the rotated local maps;

the second gradient direction determining module is configured to determine a second position corresponding to second environmental contour points of a pre-built global map in the mobile robot and as second gradient direction of each of the second environmental contour points; and the target pose determining module is configured to predict a third position in the global map of the mobile robot in each of the rotated local maps based on the second gradient direction, the second position, and the angle histogram in each of the rotated local maps, count an appearance amount of the third positions, and determine a target pose of the mobile robot in the global map based on the appearance amount.

The mobile robot 6 may include, but is not limited to, a processor 60 and a storage 61. It should be noted by those skilled in the art that FIG. 6 is merely an example of the mobile robot 6 and does not constitute a limitation on the mobile robot 6, and may include more or fewer components than those shown in the figure or a combination of some components or different components. For example, the mobile robot 6 may further include an input/output device, a network access device, a bus, and the like.

The processor 60 may be a central processing unit (CPU), or be other general purpose processor, a digital signal processor (DSP), an application, specific, integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 61 may be an internal storage unit of the mobile robot 6, for example, a hard disk or a memory of the mobile robot 6. The storage 61 may also be an external storage device of the mobile robot 6, for example, a plug-in hard disk, a smart media card (SMC), a secure digital (SD) card, flash card, and the like, which is equipped on the mobile robot 6. Furthermore, the storage 61 may further include both an internal storage unit and an external storage device, of the mobile robot 6. The storage 61 is configured to store the computer program 62 and other programs and data required by the mobile robot 6. The storage 61 may also be used to temporarily store data that has been or will be output.

Those skilled in the art may clearly understand that, for the convenience and simplicity of description, the specific operation process of the above-mentioned mobile robot, apparatus, and module/unit, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the modules, units and/or steps of each embodiment disclosed herein may be implemented through electronic hardware or a combination of computer software and electronic hardware. Whether these functions are implemented through hardware or software depends on the specific application and design constraints of the technical schemes. Those ordinary skilled in, the art may implement the described functions in different manners for each particular application, while such implementation should not be considered as beyond the scope of the present disclosure.

In the embodiments provided by the present disclosure, it should be understood that the disclosed mobile robot, apparatus, and method may be implemented in other manners. For example, the above-mentioned apparatus embodiment is merely exemplary. For example, the division of units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units ma or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the thrill of hardware or in the form of software functional unit.

When the integrated unit is implemented in form of a software functional unit and is sold or used as an independent product, the integrated unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of, the present disclosure.

What is claimed is:

1. A computer-implemented pose determining method for a mobile robot having one or more sensors, comprising executing on a processor of the mobile robot steps of:
    obtaining environment data of a current environment of the mobile robot through the one or more sensors, and building an initial local map corresponding to the current environment based on the environment data;
    rotating the initial local map according to a first preset angular interval to obtain rotated local maps, and obtaining a first position of the mobile robot in each of the rotated local maps;
    determining first environmental contour points of each of the rotated local maps and a first gradient direction corresponding to each of the first environmental contour points, and obtaining a relative position of each of the first environmental contour points and the corresponding first position in each of the rotated local maps;
    building an angle histogram in each of the rotated local maps corresponding to the relative position based on a second preset angular interval and the first gradient direction of each of the rotated local maps;
    determining a second position corresponding to second environmental contour points of a pre-built global map and a second gradient direction each of the second environmental contour points; and
    predicting a third position in the global map of the mobile robot in each of the rotated local maps based on the second gradient direction, the second position, and the angle histogram in each of the rotated local maps, counting an appearance amount of the third positions, and determining a target pose of the mobile robot in the global map based on the appearance amount.

2. The method of claim 1, wherein the step of predicting the third position in the global map of the mobile robot in each of the rotated local maps based on the second gradient direction, the second position, and the angle histogram in each of the rotated local maps, counting the appearance amount of the third positions, and determining the target pose of the mobile robot in the global map based on the appearance amount comprises:
    determining an angular interval of the second environmental contour points in each of the angle histograms based on the second gradient direction;
    obtaining a target relative position in the angular interval, and predicting the third position in the global map of the mobile robot in each of the rotated local maps based on the second position and the target relative position;
    counting the appearance amount of the third positions in each of the rotated local maps; and
    determining the third position with the largest appearance amount as a target position of the mobile robot in the global map, and determining a first heading angle of the mobile robot in the rotated local map corresponding to the third position with the largest appearance amount as the target beading angle of the mobile robot in the global map.

3. The method of claim 2, wherein before the step of determining the first heading angle of the mobile robot in the rotated local map corresponding to the third position with the largest appearance amount as the target heading an of the mobile robot in the global map further comprises;
    obtaining an initial heading angle of the mobile robot in the initial local map before the initial local map is rotated; and
    determining a rotational amount of each of the rotated local maps, and determining the first heading angle of the mobile robot in each of the rotated local maps based on the rotational amount, the first preset angular interval, and the initial heading angle.

4. The method of claim 1, wherein the step of building the angle histogram in each of the rotated local maps corresponding to the relative position based on the second preset angular interval and the first gradient directions of each of the rotated local maps comprises:
    performing a pre-processing on each of the first gradient directions according to a preset processing manner to obtain a second angle corresponding to each of the first gradient directions; and
    building the angle histogram in each of the rotated local maps corresponding to the relative position based on the second preset angular interval and the second angle.

5. The method of claim 1, wherein the step of determining the first environmental contour points of each of the rotated local maps and the first gradient direction corresponding to each of the first environmental contour points comprises:
    detecting the first environmental contour points of each of the rotated local maps through a Sobel operator, and calculating the first gradient direction corresponding to each of the first environmental contour points.

6. The method of claim 5, wherein the step of calculating the first gradient direction corresponding to each of the first environmental contour points comprises:
    calculating the first gradient direction based on the following formula:

$$Angle_{ij} = \arctan\left(\frac{G_{yij}}{G_{xij}}\right);$$

where, $Angle_{ij}$ is the first gradient direction corresponding to the j-th first environmental contour point of the i-th muted local map, and $G_{xij}$ is a first gradient of the j-th first environmental contour point of the i-th rotated local map in the first gradient direction, $G_{yij}$ is first gradient of the j-th first environmental contour point of the i-th rotated local map in the second gradient direction.

7. The method of claim 1, wherein the one or more sensors comprise a laser scanner, and the step of obtaining the environment data of the current environment of the mobile robot through the one or more sensors comprises:

obtaining the environment data of the current environment of the mobile robot through the laser scanner.

8. A pose determining apparatus for a mobile robot having one or more sensors, comprising:
- a local map building module configured to obtain environment data of a current environment of the mobile robot through the one or more sensors, and build local maps corresponding to the current environment based on the environment data;
- a first position obtaining module configured to rotate the local maps according to a first preset angular interval, and obtain a first position of the mobile robot in each of the local maps;
- a relative position obtaining module configured to determine first environmental contour points of each of the local maps and a first gradient direction corresponding to each of the first environmental contour points, and obtain a relative position of each of the first environmental contour points and the corresponding first position in each of the local maps;
- an angle histogram building module configured to build an angle histogram in each of the local maps corresponding to the relative position based on a second present angular interval anal the first gradient direction of each of the local maps;
- a second gradient direction determining module configured to determine a second position corresponding to second environmental contour points of a pre-built global map in the mobile robot and a second gradient direction of each of the second environmental contour points; and
- a target pose determining module configured to predict a third position its the global map of the mobile robot in each of the local maps based on the second gradient direction, the second position, and the angle histogram in each of the local maps, count an appearance amount of the third positions, and determine a target pose of the mobile robot in the global map based on the appearance amount.

9. The apparatus, of claim 8, wherein the target pose determining module comprises:
- an angular interval determining unit configured to determine an angular interval of the second environmental contour points in each of the angle histograms based on the second gradient direction;
- a second pose determining unit configured to obtain a target relative, position in the angular interval, and predicting the third position in the global map of the mobile robot in each of the local maps based on the second position and the target relative position;
- an appearance amount counting unit configured to count the appearance amount of the third positions in each of the local maps; and
- a target pose determining unit configured to determine the third position with the largest appearance amount as a target position of the mobile robot in the global map, and determining a first heading angle of the mobile robot in the local map corresponding to the third position with the largest appearance amount as the target heading angle of the mobile robot in the global map.

10. The apparatus of claim 8, wherein the one or more sensors comprise a laser scanner, and the local map building module is configured to obtain the environment data of the current environment of the mobile robot through the laser scanner.

11. A mobile robot, comprising:
- one or more sensors;
- a memory;
- a processor; and
- one or more computer programs stored in the memory and executable on the processor, wherein the one or more computer programs comprise:
- instructions for obtaining environment data of a current environment of the mobile robot through the one or more sensors, and building an initial local map corresponding to the current environment based on the environment data;
- instructions for rotating the initial local map according to a first preset angular interval to obtain rotated local maps, and obtaining a first position of the mobile robot in each of the rotated local maps;
- instructions for determining first environmental contour points of each of the rotated local maps and a first gradient direction corresponding to each of the first environmental contour points, and obtaining a relative position of each of the first environmental contour points and the corresponding first position in each of the rotated local maps;
- instructions for building an angle histogram in each of the rotated local maps corresponding to the relative position based on a second preset angular interval and the first gradient direction of each of the rotated local maps;
- instructions for determining a second position corresponding to second environmental contour points of a pre-built global map and a second gradient direction of each of the second environmental contour points; and
- instructions for predicting a third position in the global map of the mobile robot in each of the rotated local maps based on the second gradient direction, the second position, and the angle histogram in each of the rotated local maps, counting an appearance amount of the third positions, and determining a target pose of the mobile robot in the global map based on the appearance amount.

12. The mobile robot of claim 11, wherein the instructions for predicting the third position in the global map of the mobile robot in each of the rotated local maps based on the second gradient direction, the second position, and the angle histogram in each of the rotated local maps, counting the appearance amount of the third positions, and determining the target pose of the mobile robot in the global map based on the appearance amount comprise:
- instructions for determining an angular interval of the second environmental contour points in each of the angle, histograms based on the second gradient direction;
- instructions for obtaining a target relative position in the angular interval, and predicting the third position in the global map of the mobile robot in each of the rotated local maps based on the second position and the target relative position;
- instructions for counting the appearance amount of the third positions in each of the rotated local maps; and
- instructions for determining the third position with the largest appearance amount as a target position of the mobile robot in the global map, and determining a first heading angle of the mobile robot in the rotated local map corresponding to the third position with the largest appearance amount as the target heading angle of the mobile robot in the global map.

13. The mobile robot of claim 12, wherein the one or more computer programs further comprise:
   instructions for obtaining an initial heading angle of the mobile robot in the initial local map before the initial local map is rotated; and
   instructions for determining a rotational amount of each of the rotated local maps, and determining the first heading angle of the mobile robot in each of the rotated local maps based on the rotational amount, the first preset angular interval, and the initial heading angle.

14. The mobile robot of claim 11, wherein the instructions for building the angle histogram in each of the rotated local maps corresponding to the relative position based on the second preset angular interval and the first gradient directions of each of the rotated local maps comprise:
   instructions for performing a pre-processing on each of the first gradient directions according to a preset processing manner to obtain a second angle corresponding to each of the first gradient directions; and
   instructions for building the angle histogram in each of the rotated local maps corresponding to the relative position based on the second preset angular interval and the second angle.

15. The mobile robot of claim 11, wherein the instructions for determining the first environmental contour points of each of the rotated local maps and the first gradient direction corresponding to each of the first environmental contour points comprise:
   instructions for detecting the first environmental contour points of each of the rotated local maps through a Sobel operator, and calculating the first gradient direction corresponding to each of the first environmental contour points.

16. The mobile robot of claim 15, wherein the instructions for calculating the first gradient direction corresponding to each of the first environmental contour points comprise:
   instructions for calculating the first gradient direction based on the following formula:

$$Angle_{ij} = \arctan\left(\frac{G_{yij}}{G_{xij}}\right);$$

where, $Angle_{ij}$ is the first gradient direction corresponding to the j-th first environmental contour point of the i-th rotated local map, and $G_{xij}$ is a first gradient of the j-th first environmental contour point of the i-th rotated local map in the first gradient direction, $G_{yij}$ is a first gradient of the j-th first environmental contour point of the i-th rotated local map in the second gradient direction.

17. The mobile robot of claim 11, wherein the one or more sensors comprise a laser scanner, and the instructions for obtaining the environment data of the current environment of the mobile robot through the one or more sensors comprise:
   instructions for obtaining the environment data of the current environment of the mobile robot through the laser scanner.

* * * * *